(12) United States Patent
Hudman

(10) Patent No.: US 9,841,496 B2
(45) Date of Patent: Dec. 12, 2017

(54) MULTIPLE PATTERN ILLUMINATION OPTICS FOR TIME OF FLIGHT SYSTEM

(71) Applicant: Microsoft Technology Licensing, LLC, Redmond, WA (US)

(72) Inventor: Joshua M. Hudman, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 14/550,644

(22) Filed: Nov. 21, 2014

(65) Prior Publication Data
US 2016/0146927 A1    May 26, 2016

(51) Int. Cl.
| G01S 7/486 | (2006.01) |
| G01S 17/08 | (2006.01) |
| G01S 17/89 | (2006.01) |
| G01S 7/481 | (2006.01) |

(52) U.S. Cl.
CPC .......... *G01S 7/4865* (2013.01); *G01S 7/4814* (2013.01); *G01S 17/08* (2013.01); *G01S 17/89* (2013.01)

(58) Field of Classification Search
CPC ................................ G03B 15/06; H04N 13/02
See application file for complete search history.

(56) References Cited

U.S. PATENT DOCUMENTS

| 5,684,566 A | 11/1997 | Stanton |
| 6,859,326 B2 | 2/2005 | Sales |
| 8,350,847 B2 | 1/2013 | Shpunt |
| 8,390,821 B2 | 3/2013 | Shpunt et al. |
| 8,493,496 B2 | 7/2013 | Freedman et al. |
| 8,761,594 B1 | 6/2014 | Gross et al. |
| 2010/0060718 A1* | 3/2010 | Forster ................ G01B 11/25 348/47 |
| 2014/0049610 A1 | 2/2014 | Hudman et al. |
| 2014/0049766 A1 | 2/2014 | Hudman et al. |

(Continued)

FOREIGN PATENT DOCUMENTS

JP    2001133231 A    5/2001

OTHER PUBLICATIONS

"International Search Report and Written Opinion Issued in PCT Application No. PCT/US2015/060245", Mailed Date: Feb. 9, 2016, 10 Pages.

(Continued)

*Primary Examiner* — Luke Ratcliffe
(74) *Attorney, Agent, or Firm* — Fiala & Weaver P.L.L.C.

(57) ABSTRACT

Methods, systems, apparatuses, and computer program products are provided for creating multiple patterns of flood illumination for a time of flight (TOF) camera system. Light is generated, and from the generated light, illumination light is formed that is projected into an image environment. The illumination light is formed by: diverging the generated light to form divergent light characterized by a light profile that is less intense in a first region centered on an optical axis of the divergent light than in a second region that at least partially rings the first region, and converting the divergent light into a plurality of illumination light patterns to be projected into the illumination environment. The illumination light patterns are each projected to a corresponding region of the illumination environment.

20 Claims, 9 Drawing Sheets

(56) References Cited

U.S. PATENT DOCUMENTS

2014/0340484 A1* 11/2014 Pfister ............... H04N 13/0253
348/46
2015/0163474 A1* 6/2015 You ........................ G01S 17/89
348/46

OTHER PUBLICATIONS

Zizka, et al., "SpeckleSense: Fast, Precise, Low-cost and Compact Motion Sensing using Laser Speckle", In Proceedings of the 24th Annual ACM Symposium on User Interface Software and Technology, Oct. 16, 2011, 10 pages.
"Design of Diffraction Gratings", Published on: Jan. 24, 2013, Available at: http://spie.org/samples/TT62.pdf, 10 pages.
Wu, et al., "Patterning Flood Illumination with Microlens Arrays", In Proceedings of Applied Optics vol. 41, No. 13, May 1, 2002, pp. 2575-2585.
Hessler, et al., "Microlens Arrays with Spatial Variation of the Optical Functions", In Journal of the European Optical Society Pure and Applied Optics, Nov. 1997, pp. 673-681.
"Second Written Opinion Issued in PCT Application No. PCT/US2015/060245", Mailed Date: Oct. 10, 2016, 6 Pages.
"International Preliminary Report on Patentability Issued in PCT Application No. PCT/US2015/060245", Mailed Date: Feb. 3, 2017, 7 Pages.

* cited by examiner

MULTIPLE PATTERN ILLUMINATION OPTICS FOR TIME OF FLIGHT SYSTEM

BACKGROUND

In a time-of-flight (TOF) depth camera, light is projected from a light source into an image environment to illuminate one or more objects in the image environment. A diffuser may be used to spread the light throughout the image environment. Light reflected from the image environment is focused onto an image sensor. A timing of the received light is determined, and the timing is used to determine distances to various points in the environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for creating multiple patterns of flood illumination for a time of flight (TOF) camera system. Light is generated, and from the generated light, illumination light is formed that is projected into an image environment. The illumination light is formed by diverging the generated light to form divergent light characterized by a light profile that is more intense in a first region away from an optical axis of the divergent light than in a second region centered on the optical axis, and converting the divergent light into a plurality of illumination light patterns to be projected into the illumination environment. The illumination light patterns are each projected to a corresponding region of the illumination environment at the same time.

Further features and advantages of various embodiments of the disclosure, as well as the structure and operation of various embodiments of the disclosure, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1 schematically shows an example time-of-flight (TOF) depth camera in an example use environment according to an exemplary embodiment.

FIG. 2 schematically shows an example illuminator for an example time-of-flight depth camera, the example illuminator depicted as changing a shape of a light envelope according to an embodiment of the present disclosure.

FIG. 3 schematically shows another example illuminator according to an embodiment of the present disclosure.

FIG. 4 schematically shows an example of a light-shaping stage for an example illuminator according to an embodiment of the present disclosure.

FIG. 5 schematically shows another example of a light-shaping stage according to an embodiment of the present disclosure.

FIG. 6 schematically shows a perspective view of an example lens element included in an example light-shaping stage according to an embodiment of the present disclosure.

FIG. 7 shows a plot of an example relationship between incoherent irradiance and an optical axis of illumination light illustrating an example illumination profile according to an embodiment of the present disclosure.

FIG. 8 schematically shows an example of a diffractive element that spreads a light ray, according to an embodiment.

FIG. 9 schematically shows an example of an illuminator that generates and spreads multiple light rays to generate multi-light profile illumination light, according to an embodiment.

Figure 1:
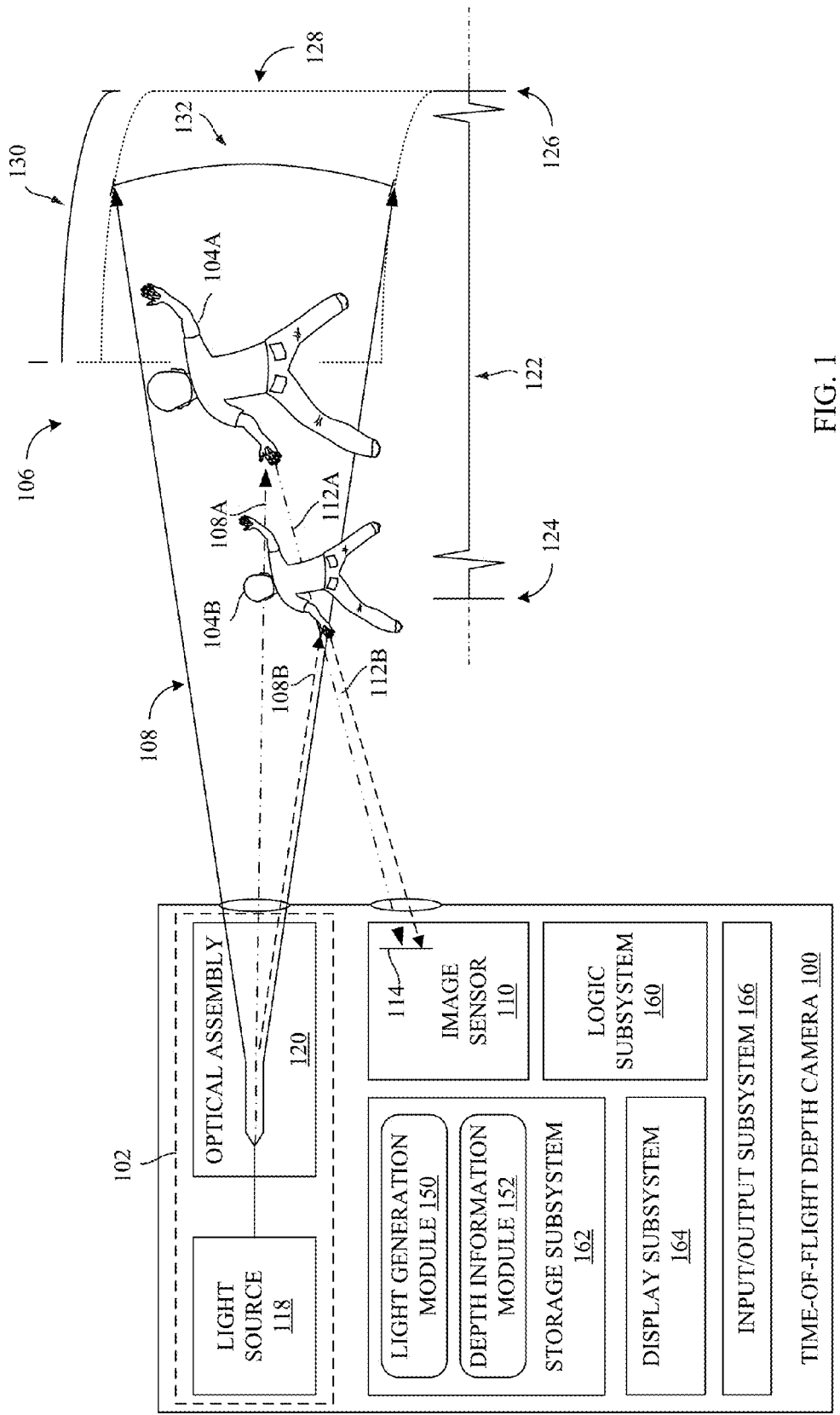

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Illuminating an Image Environment with Multiple Simultaneous Illumination Patterns As mentioned above, a TOF depth camera utilizes light pulses (e.g. infrared and/or visible light) projected from the TOF depth camera into an image environment. The illumination light pulses reflect from the various surfaces of objects in the image environment and are received by an image sensor. The TOF depth camera generates distance data by quantifying time-dependent return light information. In other words, because light is detected sooner when reflected from a feature nearer to the photosensitive surface than from an object feature farther away, the TOF depth camera can determine distance information about the object's features.

It can be difficult to fill the image environment with illumination light, as the image environment may have a sizeable volume and may have a cross-sectional shape (e.g. rectangular) that can be difficult to achieve with a single light intensity profile. For instance, the imaging environment may have a different cross-sectional shape than light emitted by the light source. The imaging environment also may be relatively large to capture potentially large ranges of movements of potentially multiple users.

Illumination sources used with TOF depth cameras may emit light in circular patterns or circularly-shaped emission envelopes. Therefore, overlaying a circularly-shaped emission pattern onto a non-circular image environment in a manner that achieves a relatively uniform illumination intensity across the entire non-circular image environment may result in the illumination of portions of the environment that are not used for depth analysis. This may waste light source power, and also may involve the use of a more powerful and expensive light source.

Furthermore, it can be difficult to illuminate different regions of the image environment differently, in a desired manner. For example, it may be desirable for the intensity of the projected light to be greater in a region near a periphery of the image environment than in a center of the imaging environment, as light reflected from those regions may have a lower intensity at the image sensor due to the angle of incidence on the imaging optics. Each distance to be illuminated in the environment typically requires its own illumination profile, leading to multiple illumination profiles being used. Typically, this is accomplished by using multiple, differently designed diffusers.

Still further, it may be desired to illuminate different areas at different distances in the imaging environment simultaneously. Typically this is performed by using different illumination profiles provided by different diffuser designs.

Accordingly, various embodiments of TOF depth cameras and methods for illuminating image environments with illumination light are provided herein to reshape emitted light and adjust a projection envelope and illumination cross-section for the reshaped light. Furthermore, embodiments, enable light defined by multiple illumination profiles to be projected into an imaging environment to illuminate different regions of the imaging environment simultaneously. In one example, a TOF depth camera is provided that includes a light source configured to generate coherent light. The example TOF depth camera also includes a first optical stage (e.g., an array of periodically-arranged lens elements) positioned to receive at least a portion of the coherent light and adapted to diverge the coherent light to form divergent light. The example TOF depth camera may also optionally include a second optical stage positioned to receive at least a portion of the divergent light, and adapted to reduce an intensity of one or more diffraction artifacts from the divergent light to form illumination light. Still further, the TOF depth camera includes a diffractive element (or "diffractive surface(s)") positioned to receive at least a portion of the illumination light. The diffractive element is configured to convert the received light into a plurality of illumination light patterns to be projected into an illumination environment. Each of the plurality of illumination light patterns is projected to a corresponding region of the illumination environment, thereby illuminating multiple regions of the illumination environment simultaneously. The example TOF depth camera also includes an image sensor configured to detect at least a portion of return illumination light reflected from the illumination environment.

FIG. 1 schematically shows an embodiment of a TOF depth camera 100. In the embodiment shown in FIG. 1, TOF depth camera 100 includes an illuminator 102 configured to illuminate at least portions of first and second objects 104A and 104B positioned in an image environment 106 with multi-light profile illumination light 108, and may include an image sensor 110 configured to detect return light 112. For example, first object 104A may be positioned in a first region of image environment 106 (e.g., at a far field location, or relatively far from camera 100) and second object 104 may be positioned in a second region of image environment 106 (e.g., at a near field location, or relatively near to camera 100). A first ray of multi-light profile illumination light 108A striking a portion of object 104A is reflected as return light 112A, and a second ray of multi-light profile illumination light 108B striking a portion of object 104B is reflected as return light 112B. Photons from return light 112 may be collected and used to generate depth information for objects 104A and 104B, as explained in detail below.

While the example shown in FIG. 1 depicts a single illuminator 102 included within TOF depth camera 100, it will be appreciated that a plurality of illuminators 102 may be included within TOF depth camera 100 to illuminate an image environment.

TOF depth camera 100 also includes an image sensor 110 configured to detect at least a portion of return illumination light 112 reflected from image environment 106. Image sensor 110 includes a detector 114 for collecting return illumination light 112 for use in generating depth information (such as a depth map) for the scene.

In the embodiment shown in FIG. 1, illuminator 102 includes a light source 118 configured to generate coherent light and an optical assembly 120 configured to shape the coherent light and direct it toward image environment 106. Light source 118 may emit coherent light at any suitable wavelength(s), including but not limited to infrared and visible wavelengths.

In some embodiments, light source 118 may include one or more individual light producing elements arranged in a light cluster. As used herein, a light cluster refers to an arrangement or grouping of a plurality of light emitters configured to emit coherent light. In some embodiments, the plurality of light emitters may be included in a common housing. Such light clusters may have any suitable shape, and may include any suitable number of light emitters. In an embodiment, light source 118 may include a linearly-shaped light bar having a plurality of light emitters arranged in parallel. For example, in one specific example, a light bar may be configured to emit parallel beams of light from eleven parallel light emitters.

For the purposes of discussion, light image environment 106 may be broken down into an illumination depth region and an illumination envelope region. The illumination depth region refers to a depth of focus of the projected light. In the embodiment shown in FIG. 1, multi-light profile illumination light 108 is projected to an illumination depth region 122 bounded by a near edge 124 and a far edge 126. Illumination depth region 122 may have any suitable range. In one non-limiting example, illumination depth region 122 may be approximately 3.5 m deep.

The illumination envelope region refers to a cross-sectional area that is lit with multi-light profile illumination light 108. In the embodiment shown in FIG. 1, a rectangular-shaped illumination envelope region 128 is represented with horizontal dimension 130 and with vertical dimension 132. However, it will be appreciated that any suitably shaped illumination envelope region 128 (e.g., an elliptical shape, a polygon shape, or other closed shape) may be formed without departing from the scope of the present disclosure.

Figure 2:
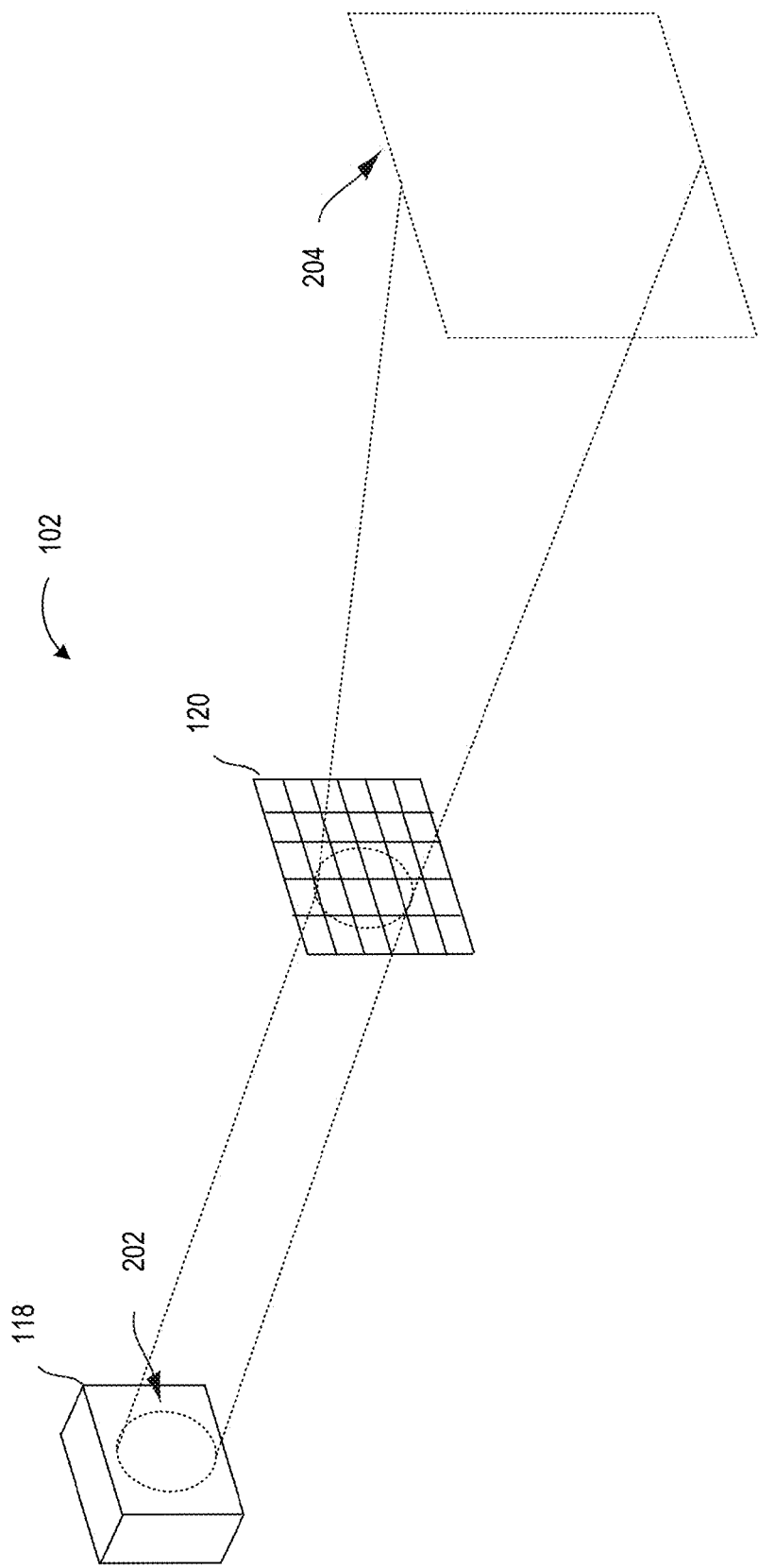

Optical assembly 120 may be configured to transform an emission envelope of light emitted by light source 118 into a differently-shaped illumination envelope shape. FIG. 2 schematically shows an embodiment of illuminator 102 in which light source 118 has a circular emission shape 202. In the example shown in FIG. 2, Optical assembly 120 transforms the circular shape into a rectangular shape 204 that is projected into illumination envelope region 128. It will be understood that the depicted divergence is presented for the purpose of illustration, and may not represent an actual divergence of the light in embodiments.

Figure 3:
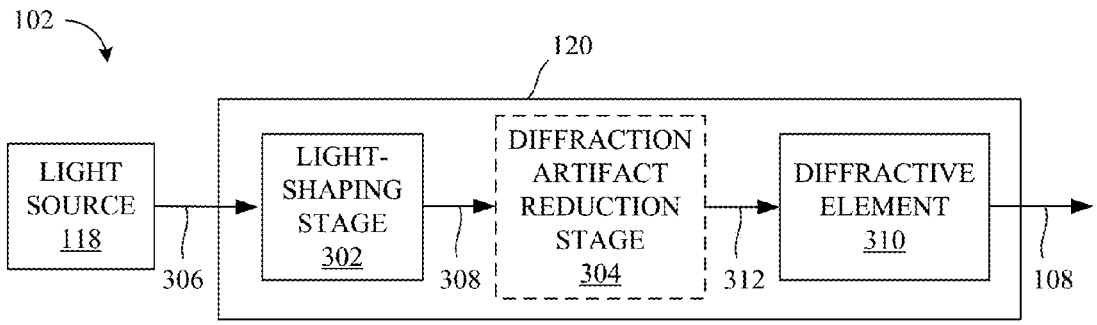

FIG. 3 schematically shows an embodiment of illuminator 102, and illustrates an example embodiment of optical assembly 120. In the embodiment shown in FIG. 3, optical assembly 120 includes a light-shaping stage 302 configured to shape and spread coherent light 306 into divergent light 308, an optional diffraction artifact reduction stage 304 configured to reduce an intensity of one or more diffraction artifacts from divergent light 308 to generate illumination light 312, and a diffractive element 310 configured to convert divergent light 308 into multiple illumination profiles as multi-light profile illumination light 108, as explained in more detail below.

Figure 4:
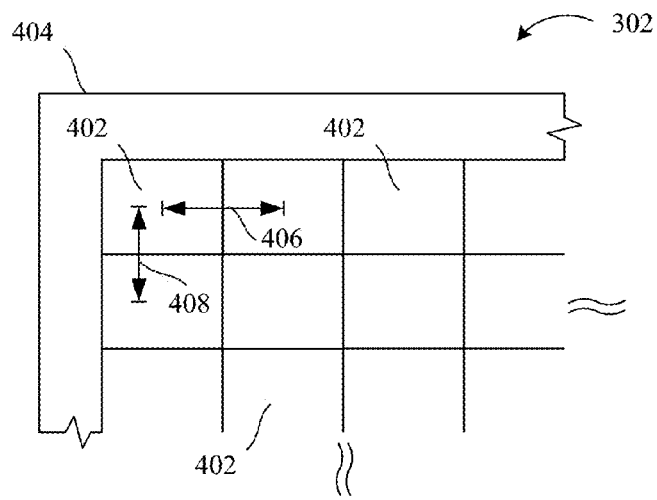

In some embodiments, light-shaping stage 302 may include a periodic array of lens elements, such as a periodic microlens array. For example, FIG. 4 schematically shows a front view of an embodiment of light-shaping stage 302 including a plurality of lens elements 402 retained by a frame 404. As shown in FIG. 4, each lens element 402 is defined with reference to a long-axis lens element pitch 406 that is different from a short-axis lens element pitch 408, so that each lens element 402 has an oblong shape. In the embodiment shown in FIG. 4, the pitch is defined with reference to the center of each cell, which may correspond to an apex of each lens surface. Other suitable pitch definitions may be employed in other embodiments without departing from the scope of the present disclosure.

The pitch of lens elements 402 may be used to select a shape of illumination envelope region 128. For example, a circular pattern of lens elements 402 would generate a corresponding circular illumination envelope region, while a hexagonal pattern of lens elements 402 would generate a hexagonal illumination envelope region. The embodiment shown in FIG. 4 depicts oblong lens elements 402, so that an oblong illumination envelope region will be generated in the far field. Further, the pitch aspect ratio exhibited by short-axis lens element pitch 408 and long-axis lens element pitch 406 may affect the aspect ratio of illumination envelope region 128. In some embodiments including oblong lens elements 402, a ratio of long-axis lens element pitch 406 to short-axis lens element pitch 408 in light-shaping stage 302 may be 1.1:1 or more. For example, each lens element 402 may have a horizontal dimension of 190 µm and a vertical dimension of 160 µm, each within an acceptable tolerance, giving a pitch aspect ratio of approximately 1.18:1. In turn, an illumination envelope region 128 having a horizontal-by-vertical angular field of illumination of approximately 70° by 60° may be formed in the far field in this example.

Figure 5:
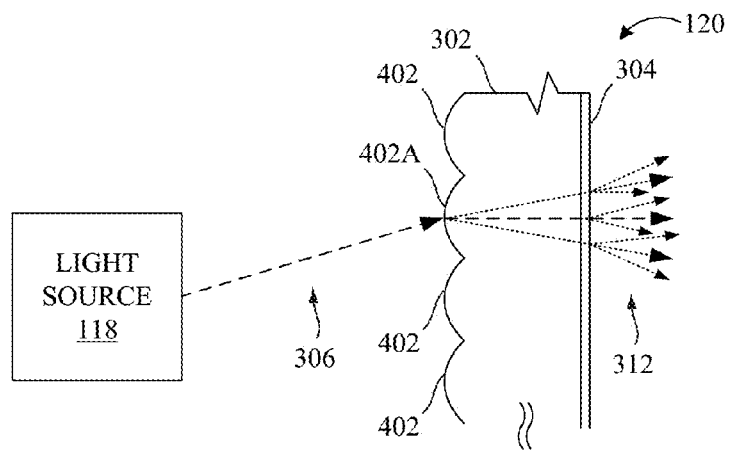

FIG. 5 shows a cross-section of an embodiment of an example light-shaping stage 302 integrated in a single piece with diffraction artifact reduction stage 304, though in some embodiments they may be separate structures. In the embodiment shown in FIG. 5, a ray of coherent light 306 received by an individual lens element 402A is spread by the element and then subsequently diffused by diffraction artifact reduction stage 304 into illumination light 310. Each of the lens elements 402 included in light-shaping stage 302 is configured to create the desired angular field of illumination (in angle space) for optical assembly 120. Put another way, each lens element 402 within light-shaping stage 302 is configured to impart a selected angular divergence to incoming light. As used herein, divergent light refers to coherent light that is spread from a more collimated beam into a less collimated beam. Divergent light 308 may have any suitable illumination intensity cross-section, as explained in more detail below, and may be spread by any suitable divergence angle, as measured between an optical axis and an extreme ray of divergent light 308.

Figure 6:
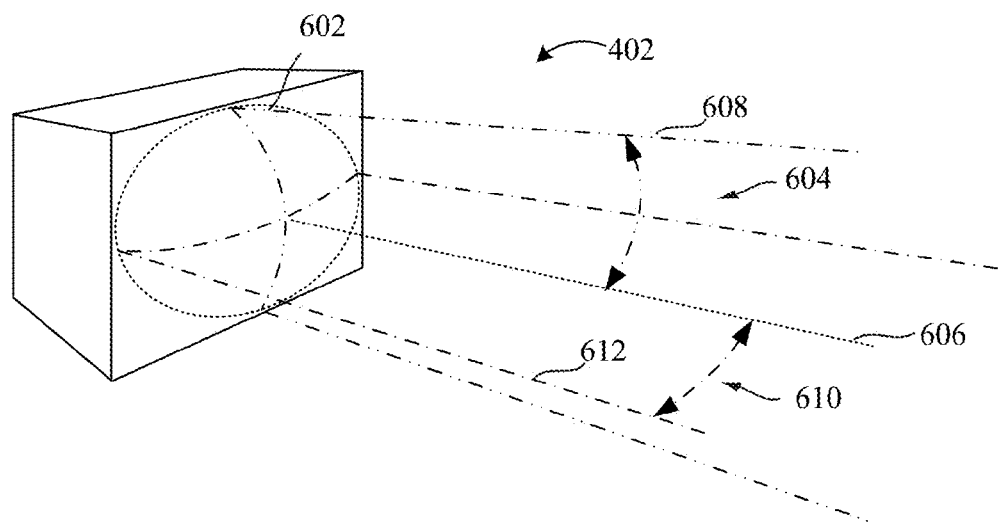

By spreading the incoming light, light-shaping stage 302 transmits light to all regions within illumination envelope region 128. In some embodiments, light-shaping stage 302 may be adapted to transform coherent light 306 into divergent light 308 having a divergence angle of greater than 30 degrees. So transformed, the light may illuminate a large angular field of illumination within image environment 106, potentially providing a large illuminated envelope for potential image capture by image sensor 110. In one non-limiting example, a 120-degree vertical field of illumination by a 140-degree horizontal field of illumination may be obtained from a vertical divergence angle of 60 degrees and a horizontal divergence angle of 70 degrees with respect to an optical axis of illumination light 312. FIG. 6 schematically shows a perspective of an embodiment of an individual lens element 402. A convex lens surface 602 is positioned toward light source 118 (not shown in FIG. 6) to receive incident coherent light 306. Positioning lens surface 602 to face light source 118 may result in comparatively higher angles of incidence before the light experiences total internal reflection within the lens element relative to examples where lens surface 602 faces away from light source 118. In turn, the angular field of illumination, and thus the illumination envelope region, may be larger when lens surface 602 faces light source 118. Further, positioning lens surface 602 to face light source 118 may reduce or eliminate some surface coatings (e.g., anti-reflective coatings such as $MgF_2$) that may otherwise be applied if lens surface 602 faces in another direction.

Lens surface 602 is shaped in part by pitch dimensions for lens element 402. In turn, the pitch dimensions for the cell may affect the aspheric nature of lens surface 602. Consequently, the diverging power of lens element 402 is established at least in part by the pitch dimensions. In the embodiment shown in FIG. 6, where lens element 402 is depicted as having an oblong cell shape, convex lens surface 602 will have a first divergence angle 604 defined between optical axis 606 and extreme ray 608, which will be different from a second divergence angle 610 defined between optical axis 606 and extreme ray 612. When projected into image environment 106, the illumination light, spread in respective directions according to these divergence angles, will establish the boundaries for illumination envelope region 128.

In some embodiments, the degree of divergence that may be realized by lens elements 402 may be affected by the refractive index of the material from which the lenses are formed. As the lens curvature increases, the light approaches a total internal reflection limit. However, by increasing the index of refraction, a selected divergence angle may be achieved with comparatively less light bending. For example, in some embodiments, lens elements 402 may be made from optical grade poly(methyl methacrylate) (PMMA) which has a refractive index of approximately 1.49. In other embodiments, lens elements 402 may be made from optical grade polycarbonate (PC), having a refractive index of approximately 1.6. Lens elements 402 made from PC may have less curvature to obtain the same divergence angle compared to elements made from PMMA. It will be appreciated that any suitable optical grade material may be used to make lens elements 402, including the polymers described above, optical grade glasses, etc.

The aggregate effect of spreading the coherent light at each lens element 402 and recombining divergent light 308 is to shape the cross-sectional light intensity/irradiance profile from a Gaussian profile associated with incident coherent light 306 into a differently-shaped illumination profile. For example, in some embodiments, as few as six lens elements 402 may be sufficient to form a desired illumination profile. However, increasing the number of lens elements 402 within a single clear element may improve the ability of light-shaping stage 302 to form a desired illumination profile.

It will be appreciated that light-shaping stage 302 may shape coherent light 306 into divergent light 208 having any suitable cross-sectional light profile without departing from the scope of the present disclosure. In some embodiments, divergent light 308 may have a flat-topped, mesa-like cross-sectional intensity profile. In such embodiments, the irradiance of divergent light 308 may have a relatively constant intensity, within an acceptable tolerance, in a region near the optical axis). The irradiance may then decrease in intensity relatively sharply in a region farther from the optical axis (e.g., a region corresponding to sidewalls of the mesa) that is outside of a desired image environment.

Figure 7:
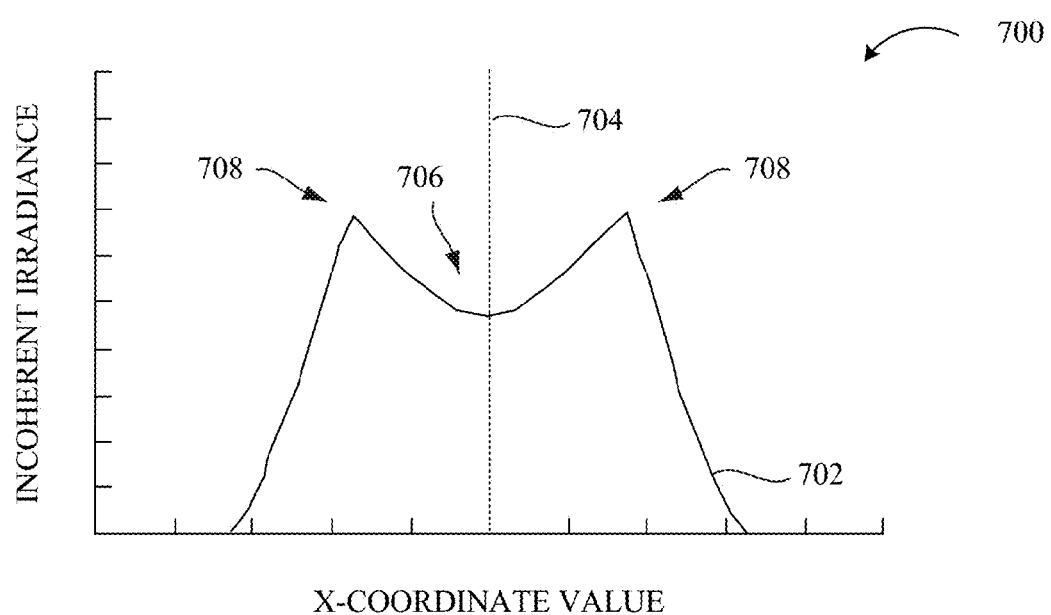

In some other embodiments, divergent light 308 may be characterized by a cross-sectional light profile that is more intense farther from an optical axis than closer to an optical axis of the divergent light. FIG. 7 shows an example plot 700 that shows a relationship between incoherent irradiance and cross-sectional position within an example light profile 702 for divergent light. In the example shown in FIG. 7, light profile 702 exhibits a greater irradiant intensity in positions in a second region 708 farther from optical axis 704 than at positions in a first region 706 on and around to optical axis 704. As shown in FIG. 7, second region 708 is to either side of first region 706, which is centered on optical axis 704. FIG. 7 shows a cross-sectional view of light profile 702, and light profile 702 exhibits cross-sectional irradiance profile somewhat resembling a capital letter "M" symmetric about optical axis 704. In an embodiment, from a front view perspective (e.g., looking down optical axis 704 in FIG. 7), light profile 702 appears as a rectangular shaped profile centered on optical axis 704, with second region 708 forming a rectangular ring around first region 706.

Without being bound by theory, generating an "M"-shaped profile for the illumination light may offset a "W"-shaped profile received at image sensor 110 and imparted to the return light by objects in the image environment. In other words, the net effect of supplying light with an "M"-shaped profile to image environment 106 may be that image sensor 110 detects return light having a relatively flat cross-sectional intensity profile, which may help to provide relatively consistent contrast and brightness across an acquired image.

Alteration of the light profile and/or the angular field of illumination may be achieved by suitably adjusting a pitch ratio for light-shaping stage 302. For example, adjusting a horizontal-to-vertical lens element pitch ratio toward unity may result in a progression toward mesa-like light profiles, while higher aspect ratios may lead to "M"-shaped profiles. In some embodiments, light-shaping stage 302 may have a horizontal-to-vertical lens element pitch ratio of 1.1:1 or more that contributes to the generation of an "M"-shaped light profile. In one non-limiting example, a horizontal-to-vertical pitch ratio of approximately 190 μm by 160 μm may lead to an "M"-shaped intensity profile.

Regardless of the particular shape of the light profile imparted to divergent light 208, the periodic arrangement of lens elements 402 that provides the light profile shape and the angular field of illumination may also lead to interference effects. Without being bound by theory, recombination of coherent light from individual lens elements 402 into divergent light 208 may introduce diffraction pattern spots within the light beam. If present, these diffraction pattern spots may cause the illumination light to incompletely light object 104, potentially leading to image capture errors at image sensor 110 and difficulties generating depth information for the scene.

Thus, various methods may be used to reduce the intensity of such diffraction artifacts. For example, in some embodiments, a degree of collimation of divergent light 308 may be adjusted to offset diffraction artifacts introduced by light-shaping stage 302. Additionally or alternatively, in some embodiments, a degree of collimation of coherent light 306 may be adjusted before the light enters light-shaping stage 302. In turn, a comparatively lower intensity and/or number of diffraction artifacts may be present in divergent light 308 exiting light-shaping stage 302 relative to unadjusted coherent light.

Further, in some embodiments, optical assembly 120 may include the aforementioned diffraction artifact reduction stage 304 to reduce an intensity of one or more diffraction artifacts from divergent light 308. In some embodiments, diffraction artifact reduction stage 304 may be configured to remove or to reduce the intensity of such artifacts by diffusing divergent light 308. As such, diffraction artifact reduction stage 304 may include a light diffusing surface adapted to adjust a degree of collimation of divergent light 308 through light scattering.

Scattering divergent light 308 may scramble diffraction patterns introduced by the periodic arrangement of lens elements 402 within light-shaping stage 302. Without being bound by theory, a Moiré pattern introduced by a specular ray of light passing through an individual lens element 402 may be diffracted by diffraction artifact reduction stage 304 to generate a halo of light around the specular beam. The halo of light may then fill in an area of lower intensity (e.g., a diffraction artifact) introduced at a neighboring lens element 402. In the aggregate, these complementary effects may smooth the light profile, reducing the intensity of diffraction interference within the system.

In some embodiments, the light diffusing surface may exhibit a surface roughness selected to suitably scatter the divergent light without altering the light profile beyond an acceptable tolerance. In one non-limiting example, a light diffusing surface may have a surface roughness (RMS) in a range of 100-200 nm. Such diffusing surfaces may be formed in any suitable manner. For example, in some embodiments, diffusing surfaces may be generated using electrical discharge machining (EDM).

It will be appreciated that other techniques may be employed to mitigate potential diffraction spots within illumination light 310. Diffraction artifact reduction stage 304, being positioned to receive light from light-shaping stage 302 (as shown in FIGS. 3 and 5, for example), conceptually may represent a post-shaping filter. In addition or as an alternative, some embodiments may employ a pre-shaping filter configured to adjust a degree of collimation before the light enters light-shaping stage 302. For example, in some embodiments, a collimator may be positioned in a light path between light source 118 and light-shaping stage 302.

As shown in FIG. 3, diffractive element 310 receives illumination light 312 from diffraction artifact reduction stage 304 (or receives divergent light 308 directly from light shaping stage 302 when stage 304 is not present). Diffractive element 310 is configured to convert illumination light 312 or divergent light 308 into multiple illumination profiles to generate multi-light profile illumination light 108. For example, with reference to FIG. 1, diffractive element 310 may generate multi-light profile illumination light 108 to illuminate a first region in which object 104A is located (e.g., a far field region that is centrally located on or close to an optical axis of multi-light profile illumination light 108) according to a first illumination profile, and may illuminate a second region in which object 104b is located (e.g., a near field region that is peripherally located) according to a second illumination profile. This may enable more accurate depth sensing using camera 100 with regard to both of objects 104A and 104B.

Figure 8:
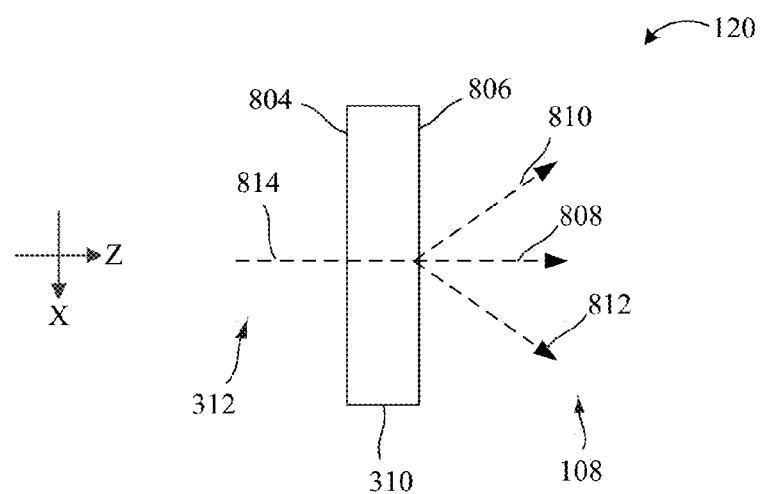

For instance, FIG. 8 shows a cross-sectional view of an example diffractive element 310 that may be included in optical assembly 120, according to an embodiment. As shown in FIG. 8, diffractive element 310 includes a rectangular body 802 that has opposing first and second surfaces 804 and 806. Although diffractive element 310 is shown individually in FIG. 8, diffractive element 310 may be coupled to (e.g., in contact with, adhered to, etc.) diffraction artifact stage 304 (when present) or light shaping stage 302. For instance, with respect to FIG. 5, in an embodiment, first surface 804 of diffractive element 310 of FIG. 8 may be coupled to the exposed surface of diffraction artifact reduction stage 304 (e.g., the surface of stage 304 on the right side of FIG. 5). Alternatively, diffractive element 310 may be spaced from diffraction artifact stage 304 and/or light shaping stage 302.

As shown in FIG. 8, illumination light 312 is received at first surface 804 of diffractive element 310. In the example of FIG. 8, illumination light 312 includes a single ray 814 of light for ease of illustration. As shown in FIG. 8, light ray 814 is converted into three light ray components, a zero component 808, a minus component 810, and a plus component 812. Zero component 808 generally passes straight through diffractive element 310 without change of direction from the input light ray 814. Minus component 810 is redirected further in a negative direction (upward in FIG. 9) by diffractive element 310 relative to the input light ray 814. Plus component 812 is redirected further in a positive direction (downward in FIG. 9) by diffractive element 310 relative to the input light ray 814.

Accordingly, diffractive element 310 creates multiple output light components from an input light ray, and redirects the output light components in a spread pattern. When multiple light rays of a light source are taken into account, the multiple light rays are spread to form an overall light illumination profile that may include multiple light illumination profiles that are superimposed on each other.

Figure 9:
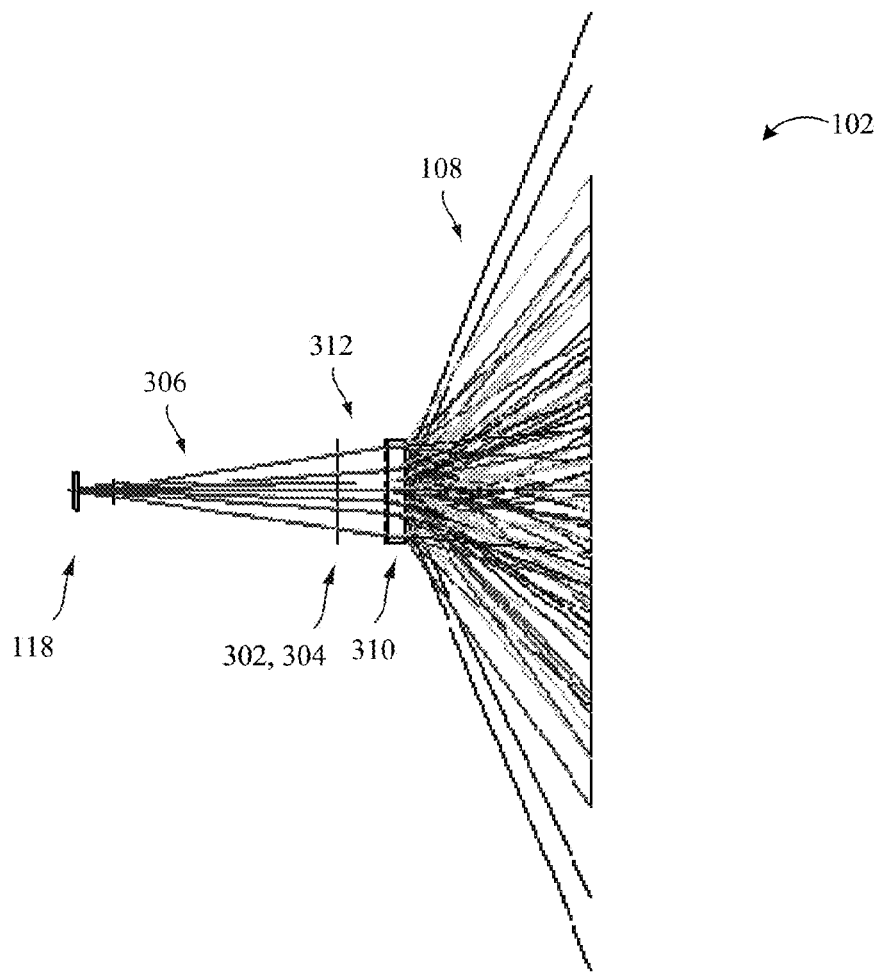

For instance, FIG. 9 schematically shows an example of illuminator 102 that generates and spreads multiple input light rays to generate multi-light profile illumination light, according to an embodiment. As show in FIG. 9, light source 118 may be configured to generate coherent light 306, which may be considered to include a multitude of light rays, some of which are shown. Light-shaping stage 302 is configured to shape and spread coherent light 306 into divergent light 308 (FIG. 3), and optional diffraction artifact reduction stage 304 is configured to reduce an intensity of one or more diffraction artifacts from the divergent light 308 to generate illumination light 312. Diffractive element 310 receives and converts illumination light 312 into multi-light profile illumination light 108. Multi-light profile illumination light 108 includes the light rays of illumination light 312 spread into multiple components across a wider illumination range. Furthermore, the spread pattern caused by diffractive element 310 may be tailored to create any desired illumination effect, including enabling diffractive element 310 to generate multiple separate light illumination patterns or profiles, as desired. This is performed by diffractive element 310 being configured to cluster output light rays in predetermined patterns in predetermined target regions of the imaging environment, each predetermined pattern and target region defining a corresponding light illumination profile.

Diffractive element 310 may perform such generation of multiple simultaneous light illumination patterns or profiles by using light wave interference techniques. For instance, in an embodiment, diffractive element 310 may be a grating that includes a plurality of holes or openings in an embodiment. The openings receive illumination light 312, and act as point sources for the light waves passing through. The light waves passing through the openings interfere with each other to create an interference pattern that defines the overall output light illumination pattern. In another embodiment, first surface 804 and/or second surface 806 of diffractive element 310 may be patterned with a series of repeating surface features that each generate a wave front for the light passing through them. The surface features may approximate openings as in a grating, and may each be tailored in height, width, and/or shape to each generate a output light waves having a predetermined phase. The output light waves that radiate from diffractive element 310 at second surface 806 interfere with each other to generate the desired output light illumination profiles.

Diffractive element 310 may be made of any suitable transparent material, including the materials described above for the lens elements 402 (e.g., optical grade poly (methyl methacrylate) (PMMA), optical grade polycarbonate (PC), other polymers, optical grade glass, etc.) or other suitable materials.

First and second surfaces 804 and/or 806 of diffractive element 310 may be patterned with any desired repeating pattern of surface features used to generate and tailor a desired interference pattern for light passing through in order to generate the desired output light illumination profiles. For instance, FIGS. 10-13 show example embodiments for surface features for diffractive element 310, according to embodiments. Although the examples of FIGS. 10-13 show the surface features being formed on second surface 806 of diffractive element 310 (e.g., on the light output side), in other embodiments, the surface features may be formed on first surface 804 (e.g., the light input side).

Figure 10:
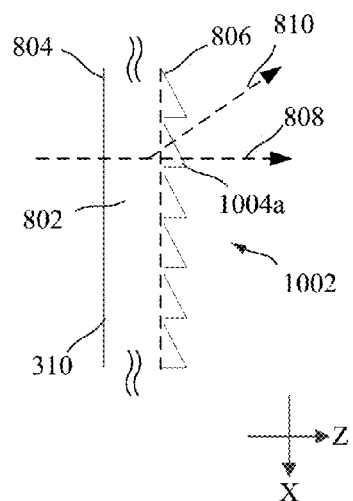
FIG. 10 shows a cross-sectional view of a diffractive element that has a repeating prism pattern on a surface, according to an embodiment.

In a first example, FIG. 10 shows a cross-sectional view of diffractive element 310 with a repeating prism pattern 1002 on surface 806, according to an embodiment. In particular, in the example of FIG. 10, first surface 804 of diffractive element 310 is substantially planar, and second surface 806 includes repeating prism pattern 1002, which is a repeating pattern of prism shaped surface features (e.g., a saw tooth pattern). For illustrative purposes, a first prism 1004a of repeating prism pattern 1002 is indicated in FIG. 10. First prism 1004a has the cross-sectional shape of a right triangle (in an embodiment, the prism shape is continuous in the Y direction, e.g., into the drawing). As shown in FIG. 10, two components of output light are formed from an input light passing through first prism 1004a. In particular, light ray 814 is converted into zero component 808 and minus component 810. Zero component 808 generally passes straight through diffractive element 310 without change of direction from the input light ray 814. Minus component 810 is redirected further in a negative direction (upward in FIG. 10) by diffractive element 310 relative to the input light ray 814.

The size and shape of first prism 1004a and the other prisms of repeating prism pattern 1002 may be tailored to direct the zero and minus components of light as desired. For instance, a height of first prism 1004a (in the Z direction) and/or a width of first prism 1004a (in the X direction) may be increased or decreased to change a phase and/or intensity of zero and minus components 808 and 810, as well as their directions. The light waves that exit the repeating prisms interfere with each other to create an interference pattern that defines the overall output light illumination pattern. Due to the zero and minus components being separate, multiple light illumination patterns can be formed (e.g., a first light illumination pattern corresponding to a clustering of light of the zero components, and a second light illumination pattern corresponding to a clustering of light of the minus components). Therefore, illumination light 312 (FIG. 9) that passes through diffractive element 310 of FIG. 10 may be converted into multiple desired output light illumination profiles.

Figure 11:
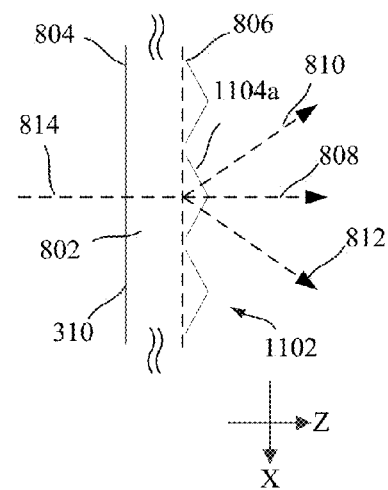
FIG. 11 shows a cross-sectional view of a diffractive element that has a repeating pattern of pyramidal prisms on a surface, according to an embodiment.

In the next example, FIG. 11 shows a cross-sectional view of diffractive element 310 with a repeating pyramidal prism pattern 1102 on surface 806, according to an embodiment. In particular, in the example of FIG. 11, first surface 804 of diffractive element 310 is substantially planar, and second surface 806 includes repeating pyramidal prism pattern 1102, which is a repeating pattern of pyramid shaped surface features (also known as a triangle wave pattern). For illustrative purposes, a first pyramidal prism 1104a of repeating pyramidal prism pattern 1102 is indicated in FIG. 11. First pyramidal prism 1104a has the cross-sectional shape of a pyramid (or triangle). As shown in FIG. 11, three components of output light are formed from an input light passing through first pyramidal prism 1104a. In particular, light ray 814 is converted into zero component 808, minus component 810, and plus component 812. Zero component 808 generally passes straight through diffractive element 310 without change of direction from the input light ray 814. Minus component 810 is redirected further in a negative direction (upward in FIG. 11) by diffractive element 310 relative to the input light ray 814. Plus component 812 is redirected further in a positive direction (downward in FIG. 11) by diffractive element 310 relative to the input light ray 814.

The size and shape of first pyramidal prism 1104a and the other prisms of repeating pyramidal prism pattern 1102 may be tailored to direct the zero, minus, and plus components of light as desired. For instance, a height of first pyramidal prism 1104a (in the Z direction) and/or a width of first pyramidal prism 1104a (in the X direction) may be increased or decreased to change a phase and/or an intensity of zero, minus, and/or plus components 808, 810, and 812, as well as their directions. The light waves that exit the repeating prisms interfere with each other to create an interference pattern that defines the overall output light illumination pattern. Due to the zero, minus, and plus components being separate, multiple light illumination patterns can be formed (e.g., a first light illumination pattern corresponding to a clustering of light of the zero components, a second light illumination pattern corresponding to a clustering of light of the minus components, and a third light illumination pattern corresponding to a clustering of light of the plus components). Therefore, illumination light 312 (FIG. 9) that passes through diffractive element 310 of FIG. 11 may be converted into multiple desired output light illumination profiles.

Figure 12:
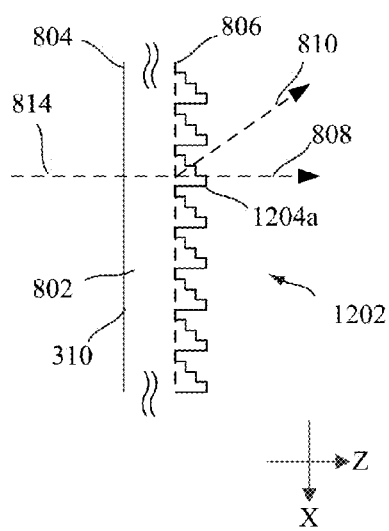
FIG. 12 shows a cross-sectional view of a diffractive element that has a repeating pattern of staircase-shaped prisms on a surface, according to an embodiment.

In a next example, FIG. 12 shows a cross-sectional view of diffractive element 310 with a repeating staircase-shaped prism pattern 1202 on surface 806, according to an embodiment. In particular, in the example of FIG. 12, first surface 804 of diffractive element 310 is substantially planar, and second surface 806 includes repeating staircase-shaped prism pattern 1202, which is a repeating pattern of staircase shaped surface features, with each staircase shaped surface feature being a set of rectangular upward progressing steps. For illustrative purposes, a first staircase shaped prism 1204a of repeating staircase-shaped prism pattern 1202 is indicated in FIG. 12. First staircase shaped prism 1204a has the cross-sectional shape of a staircase. As shown in FIG. 12, two components of output light are formed from an input light passing through first staircase shaped prism 1204a. In particular, light ray 814 is converted into zero component 808 and minus component 810. Zero component 808 generally passes straight through diffractive element 310 without change of direction from the input light ray 814. Minus component 810 is redirected further in a negative direction (upward in FIG. 12) by diffractive element 310 relative to the input light ray 814.

The size and shape of first staircase shaped prism 1204a and the other prisms of repeating staircase-shaped prism pattern 1202 may be tailored to direct the zero and minus components of light as desired. For instance, a height of each step of first staircase shaped prism 1204a (in the Z direction), a width of each step of first staircase shaped prism 1204a (in the X direction), and/or a number of steps in first staircase shaped prism 1204a may be increased or decreased to change a phase and/or an intensity of zero and minus components 808 and 810, as well as their directions. The light waves that exit the repeating prisms interfere with each other to create an interference pattern that defines the overall output light illumination pattern. In particular, each step of each staircase shaped prism creates its own light wave of a particular phase that interferes with light waves of steps of other staircase shaped prisms. Due to the zero and minus components being separate, multiple light illumination patterns can be formed (e.g., a first light illumination pattern corresponding to a clustering of light of the zero components, and a second light illumination pattern corresponding to a clustering of light of the minus components). Therefore, illumination light 312 (FIG. 9) that passes through diffractive element 310 of FIG. 12 may be converted into multiple desired output light illumination profiles.

Figure 13:
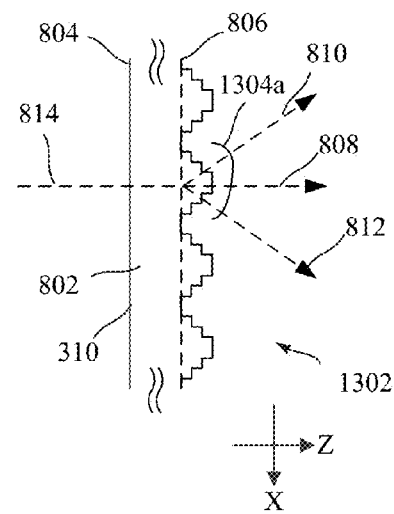
FIG. 13 shows a cross-sectional view of a diffractive element that has a repeating pattern of pyramidal staircase-shaped prisms on a surface, according to an embodiment.

In the next example, FIG. 13 shows a cross-sectional view of diffractive element 310 with a repeating pyramidal staircase-shaped prism pattern 1302 on surface 806, according to an embodiment. In particular, in the example of FIG. 13, first surface 804 of diffractive element 310 is substantially planar, and second surface 806 includes repeating pyramidal staircase-shaped prism pattern 1302, which is a repeating pattern of pyramidal staircase shaped surface features (also known as an ascending and descending staircase wave pattern). For illustrative purposes, a first pyramidal staircase prism 1304a of repeating pyramidal staircase-shaped prism pattern 1302 is indicated in FIG. 13. First pyramidal staircase prism 1304a has the cross-sectional shape of a pyramidal staircase. As shown in FIG. 13, three components of output light are formed from an input light passing through first pyramidal staircase prism 1304a. In particular, light ray 814 is converted into zero component 808, minus component 810, and plus component 812. Zero component 808 generally passes straight through diffractive element 310 without change of direction from the input light ray 814. Minus component 810 is redirected further in a negative direction (upward in FIG. 13) by diffractive element 310 relative to the input light ray 814. Plus component 812 is redirected further in a positive direction (downward in FIG. 13) by diffractive element 310 relative to the input light ray 814.

The size and shape of first pyramidal staircase prism 1304a and the other prisms of repeating pyramidal staircase-shaped prism pattern 1302 may be tailored to direct the zero, minus, and plus components of light as desired. For instance, a height of first pyramidal staircase prism 1304a (in the Z direction), a width of first pyramidal staircase prism 1304a (in the X direction), and/or a number of steps in first pyramidal staircase prism 1304a may be increased or decreased to change a phase and/or an intensity of zero, minus, and/or plus components 808, 810, and 812, as well as their directions. The light waves that exit the repeating prisms interfere with each other to create an interference pattern that defines the overall output light illumination pattern. In particular, each step of each pyramidal staircase shaped prism creates its own light wave of a particular phase that interferes with light waves of steps of other staircase shaped prisms. Due to the zero, minus, and plus components being separate, multiple light illumination patterns can be formed (e.g., a first light illumination pattern corresponding to a clustering of light of the zero components, a second light illumination pattern corresponding to a clustering of light of the minus components, and a third light illumination pattern corresponding to a clustering of light of the plus components). Therefore, illumination light 312 (FIG. 9) that passes through diffractive element 310 of FIG. 13 may be converted into multiple desired output light illumination profiles.

The example types and shapes of surface features shown in FIGS. 10-13 for diffractive element 310 are provided for purposes of illustration, and in other embodiments, other types and shapes of surface feature may be used, as would be apparent to persons skilled in the relevant art(s) from the teachings herein. Embodiments are directed to any configurations of diffractive element 310 that enable multiple flood illumination patterns (cones of light, each having a particular round or elliptical profile) to be generated from the input flood illumination pattern of illumination light 312. In other words, diffractive element 310 is configured to split up the flood illumination pattern received in illumination light 312 into multiple flood illumination patterns, corresponding to the diffraction orders configured for diffractive element 310. In FIGS. 10 and 12, diffraction element 310 is configured with two diffraction orders (optical paths), and thus illumination light 312 is split into two flood illumination patterns centered on the angles of the three diffraction orders. In FIGS. 8, 9, 11, and 13, diffraction element 310 is configured with three diffraction orders, and thus illumination light 312 is split into three flood illumination patterns centered on the configured angles of the three diffraction orders. In further embodiments, diffraction element 310 may be configured with additional diffraction orders to create greater numbers of flood illumination patterns than three.

In particular, surface 804 and/or surface 806 of diffractive element 310 are patterned, such as described above with respect to FIGS. 10-13 or in other ways, to be configured to apply a phase function on illumination light 312. The phase function sends illumination light 312 from diffractive element 310 on the multiple paths corresponding to the multiple diffraction orders. This is due to surface 804 and/or surface 806 not being planar, but rather being patterned. As such, different light rays pass through diffractive element 310 over different distances, causing the light rays to be imparted with different phases. A linear phase function imparts a linear phase shift to the light passing through diffractive element 310, which creates the "tilt" or redirection of the light at the angles of the diffraction orders. The light rays exiting diffraction element 310 are combined according to the phase function. The energy of the incoming center illumination pattern is spread over the outgoing multiple illumination patterns. The phase function causes multi-light profile illumination light 108 exiting diffractive element 312 to include light spread amongst the multiple, desired directions of the diffraction orders, creating the multiple flood illumination patterns.

The angles of the diffraction orders may have any suitable values as desired for a particular application. In one example embodiment, the first light illumination pattern (e.g., the zero component, or "straight-through" flood illumination pattern) may be centered along the zero degree Z-axis, the second light illumination pattern (e.g., the minus component) may be centered along an angle in the range of −15 to −30 degrees from the Z-axis, and the third light illumination pattern (e.g., the plus component) may be centered along an angle in the range of +15 to +30 degrees from the Z-axis. In other embodiments, other angles may be used.

Accordingly, as described above, embodiments enable multiple illumination profiles to be projected into an imaging environment simultaneously to illuminate different regions of the imaging environment differently. Each illumination pattern or profile may have any suitable configuration, as desired for a particular application.

Figure 14:
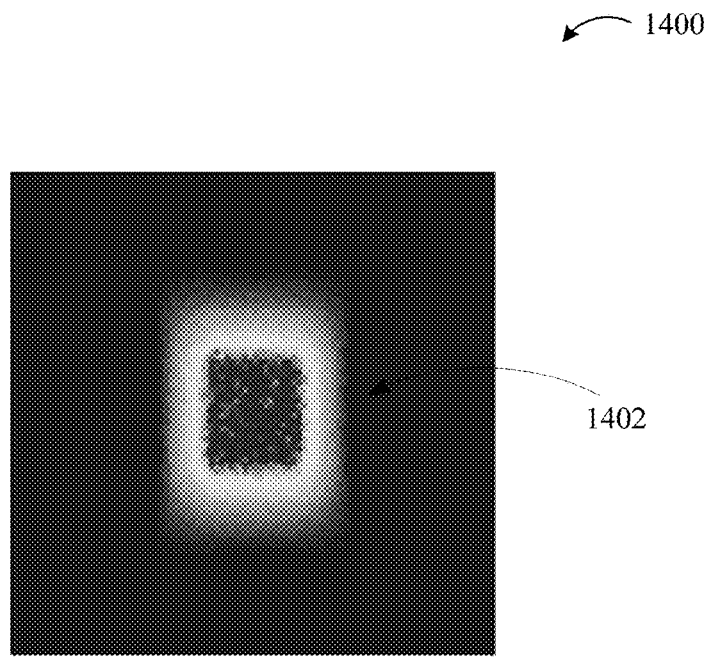
FIG. 14 shows an image of a first illumination pattern projected on a central far field region of an illumination environment, according to an example embodiment.
Figure 15:
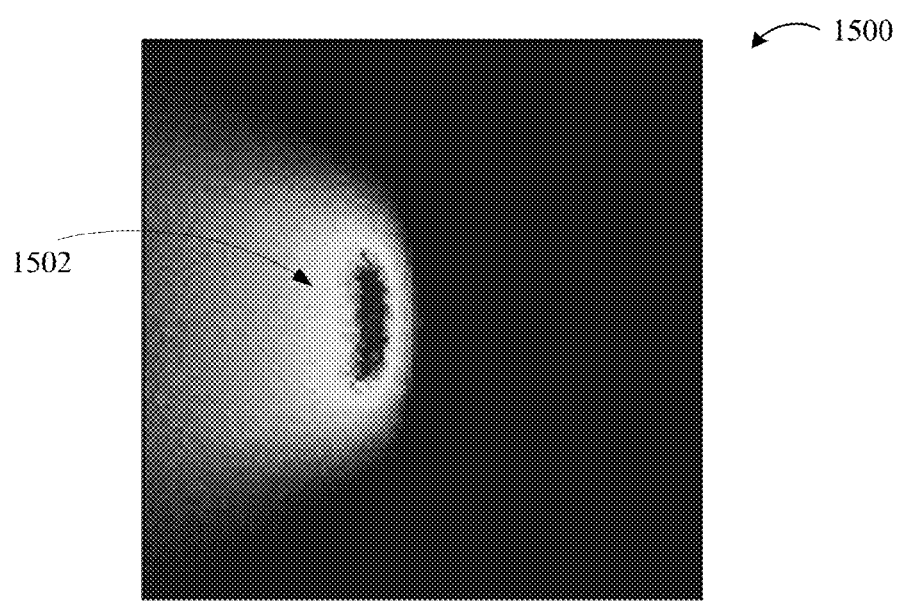
FIG. 15 shows an image of a second illumination pattern projected on a first peripheral near field region of an illumination environment, according to an example embodiment.
Figure 16:
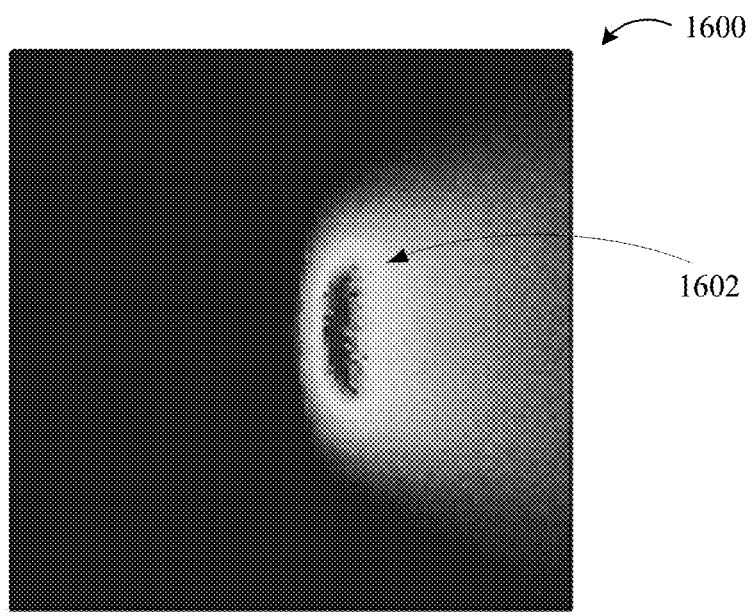
FIG. 16 shows an image of a third illumination pattern projected on a second peripheral near field region of an illumination environment, according to an example embodiment.

For instance, FIGS. 14-16 show first-third illumination patterns (e.g., "flood illumination patterns") that may be projected simultaneously into an illumination environment using a single diffractive element, according to embodiments.

For example, FIG. 14 shows an image 1400 of a first illumination pattern 1402 projected on a central far field region of an illumination environment, according to an example embodiment. Image 1400 shows a front view of first illumination pattern 1402 (e.g., directed out of the page of FIG. 14). The central dark rectangle in first illumination pattern 1402 indicates light of relatively high intensity. A rectangular ring around the central dark rectangle is relatively light, and indicates light of a medium intensity. A larger rectangular ring in first illumination pattern 1402 that is darker than the central rectangle and the relatively light rectangular ring, indicates light of low intensity. The front-on view of first illumination pattern 1402 in FIG. 14 corresponds roughly to the cross-sectional view of light profile 702 in FIG. 7, which is described above (although first illumination pattern 1402 has a flatter light profile at its center—the center of the "M" shape dips little to none in FIG. 14). First illumination pattern 1402 may be formed by the zero component of input light rays (light that travels relatively straight through diffractive element 310), and thus has a similar profile to light profile 702 shown in FIG. 7 (though of lesser intensity).

In an embodiment, first illumination pattern 1402 may be generated and projected in image environment 106 of FIG. 1 to illuminate a central far field region. For example, TOF camera 100 may be located in a room in a house, and object 104A (a first person) may be located at or near the rear of the room, on or near a central optical axis of TOF camera 100. First illumination pattern 1402 may be generated and projected to illuminate the rear of the room near the central axis in a relatively narrow angular range (e.g., 50 degrees wide).

FIG. 15 shows an image 1500 of a second illumination pattern 1502 projected on a first peripheral near field region of an illumination environment, according to an example embodiment. Image 1500 shows a front view of second illumination pattern 1502 (e.g., directed out of the page of FIG. 15). A central optical axis of second illumination pattern 1502 is at a center point of image 1500 (directed out of the page of FIG. 15), and thus is to the right of second illumination pattern 1502 in FIG. 15. The central elongated vertical dark region in second illumination pattern 1502 indicates light of relatively high intensity. The relatively light region that rings the central dark region, spreading to the left in FIG. 15, indicates light of a medium intensity. The remaining dark area in second illumination pattern 1502 indicates light of relatively low intensity. When second illumination pattern 1502 is projected simultaneously with first illumination pattern 1402, second illumination pattern 1502 illuminates a left side of the image environment. This is because, in an embodiment, second illumination pattern 1502 may be formed by the minus component of input light rays (light that is bent generally left by different degrees by diffractive element 310).

FIG. 16 shows an image 1600 of a third illumination pattern 1602 projected on a second peripheral near field region of an illumination environment, according to an example embodiment. Image 1600 shows a front view of third illumination pattern 1602 (e.g., directed out of the page of FIG. 16). A central optical axis of third illumination pattern 1602 is at a center point of image 1600 (directed out of the page of FIG. 16), and thus is to the left of third illumination pattern 1602 in FIG. 16. The central elongated vertical dark region in third illumination pattern 1602 indicates light of relatively high intensity. The relatively light region that rings the central dark region, spreading to the right in FIG. 16, indicates light of a medium intensity. The remaining dark area in third illumination pattern 1602 indicates light of relatively low intensity. When third illumination pattern 1602 is projected simultaneously with first illumination pattern 1402, third illumination pattern 1602 illuminates a right side of the image environment. This is because, in an embodiment, third illumination pattern 1602 may be formed by the plus component of input light rays (light that is bent generally right by different degrees by diffractive element 310).

In an embodiment, in addition to first illumination pattern 1402 illuminating a central far field region, second illumination pattern 1502 may be generated and projected in image environment 106 of FIG. 1 to illuminate a left peripheral near field region, and third illumination pattern 1602 may be generated and projected in image environment 106 to illuminate a right peripheral near field region. For instance, continuing the above example, TOF camera 100 may be located in a room in a house, and object 104B (a second person) may be located relatively near camera 100 in the room, but off to the left side or right side of the central optical axis of TOF camera 100. Second and third illumination patterns 1502 and 1602 may be generated and projected (along with first illumination pattern 1402) to illuminate the near left and right sides of the room in a relatively wide angular range (e.g., 110 degrees wide).

In this manner, first illumination pattern 1402 covers the central rear of the room with light, and second and third illumination patterns 1502 and 1602 cover peripheral portions of the room nearer to the camera with light, thereby enabling images of objects at various depths in the room to be captured and analyzed.

Figure 17:
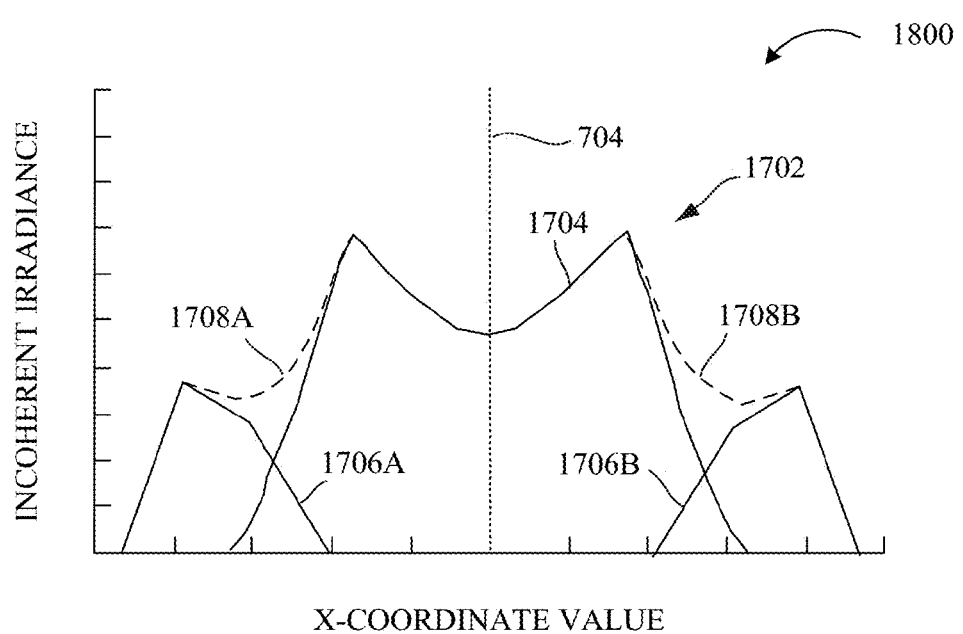
FIG. 17 shows an example illumination profile that is a combination of three illumination patterns, according to an embodiment of the present disclosure.

FIG. 17 shows a plot 1700 of an example cross-sectional view of an illumination profile 1702 that is a combination of the three illumination patterns of FIGS. 14-16, according to an embodiment of the present disclosure. As shown in FIG. 17, a central illumination profile 1704 corresponds to first illumination pattern 1402 (FIG. 14), a left illumination profile 1706A corresponds to corresponds to second illumination pattern 1502 (FIG. 15), and a right illumination profile 1706B corresponds to third illumination pattern 1602 (FIG. 16). First-third illumination profiles 1704, 1706A, and 1706B combine to form an overall illumination profile 1702 defined by first-third illumination profiles 1704, 1706A, and 1706B, where first-third illumination profiles 1704, 1706A, and 1706B are summed where they overlap (e.g., first and second illumination profiles 1704 and 1706A overlap and sum to form profile portion 1708A, and first and third illumination profiles 1704 and 1706B overlap and sum to form profile portion 1708B.

Accordingly, illumination profile 1702 is formed as the combination of three separate illumination profiles 1704, 1706A, and 1706B, which are generated simultaneously. For instance, illumination profile 1702 may be generated through the incorporation of a diffractive element 310 that diffracts light into three components, which correspond to the three illumination profiles 1704, 1706A, and 1706B. Illumination profile 1702 covers a wider area of the image environment relative to illumination profile 702 shown in FIG. 7, which does not include a diffractive element. In other embodiments, illumination profile 1702 may have other shapes, depending on the generated shapes of illumination profiles 1704, 1706A, and 1706B and/or further or lesser numbers of illumination profiles and their respective shapes.

Figure 18:
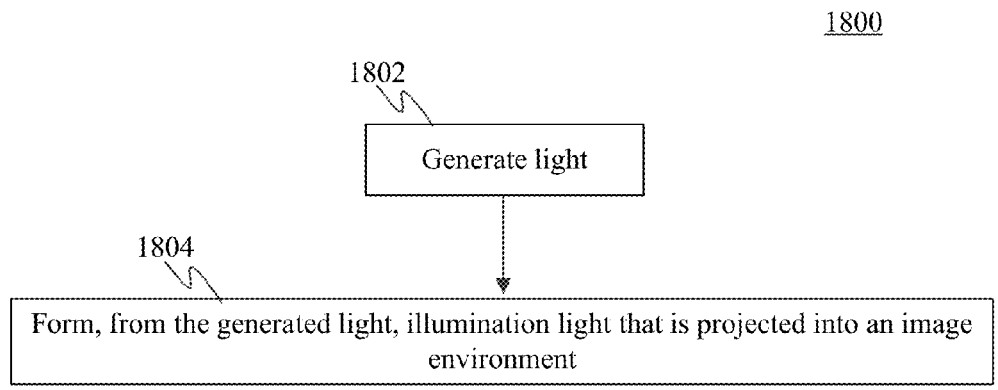
FIG. 18 shows a flowchart providing a process for projecting illumination light into an image environment, according to an example embodiment.

Accordingly, embodiments may operate in various ways to project illumination light into an image environment. For instance, FIG. 18 shows a flowchart 1800 providing a process for projecting illumination light into an image environment, according to an example embodiment. The systems and apparatuses of FIGS. 1-6 and 8-13 may operate according to flowchart 1800. Further structural and operational embodiments will be apparent to persons skilled in the relevant art(s) based on the following description of flowchart 1800.

Flowchart 1800 begins with step 1802. In step 1802, light is generated. For example, as shown in FIGS. 1 and 3, light source 118 may generate coherent light 306. Coherent light 306 is coherent light having any suitable wavelength(s), including but not limited to infrared and visible wavelengths.

In step 1804, illumination light is formed from the generated light that is projected into an image environment. For example, as shown in FIGS. 1 and 3, optical assembly 120 receives coherent light 306, and generates multi-light profile illumination light 108, which is projected into image environment 106. Multi-light profile illumination light 108 illuminates objects in image environment 106, such as objects 104A and 104B, and reflected light from the illuminated objects may be used to sense a depth of the objects, as well as being used to determine other features of the objects (e.g., shape, size, etc.). Optical assembly 120 processes coherent light 306 to generate multi-light profile illumination light 108 to include multiple illumination profiles. The multiple illumination profiles enable multiple regions and/or depths of image environment 106 to receive flood lighting simultaneously, to at least be used for depth sensing, etc.

Figure 19:
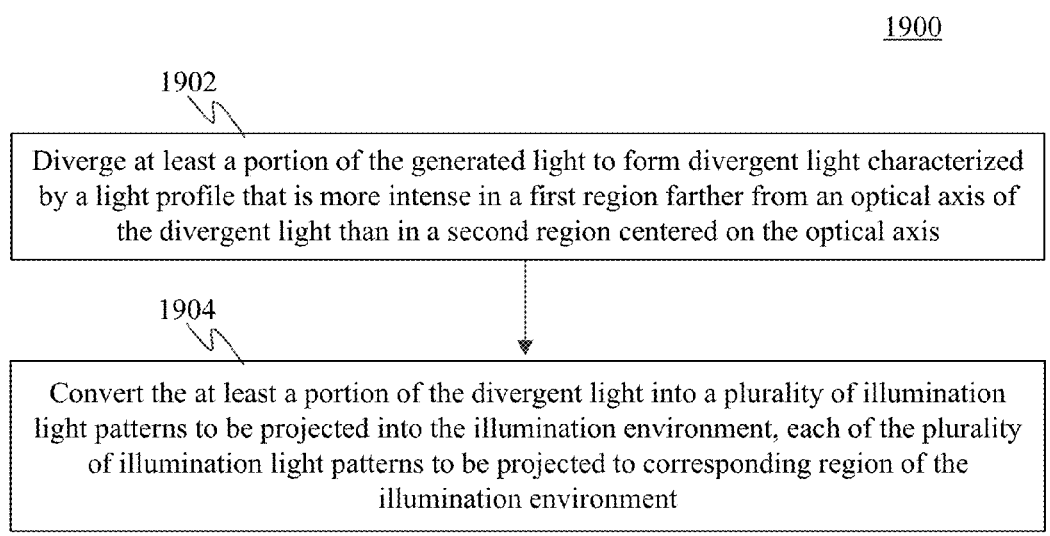
FIG. 19 shows a flowchart providing a process for forming illumination light that includes a plurality of illumination light patterns from divergent light, according to an example embodiment.

Step 1804 may be performed in various ways, in embodiments. For instance, FIG. 19 shows a flowchart 1900 providing a process for forming illumination light that includes a plurality of illumination light patterns from divergent light, according to an example embodiment. In an embodiment, flowchart 1900 may be performed by optical assembly 120 of FIGS. 1 and 3. Further structural and operational embodiments will be apparent to persons skilled in the relevant art(s) based on the following description of flowchart 1900.

Flowchart 1900 begins with step 1902. In step 1802, at least a portion of the generated light is diverged to form divergent light characterized by a light profile that is more intense in a first region farther from an optical axis of the divergent light than in a second region centered on the optical axis. For example, as shown in FIG. 3, light shaping stage 302 receives coherent light 306. As described above, light shaping stage 302 is configured to shape and spread coherent light 306 into divergent light 308. For instance, light shaping stage 302 may include a periodic microlens array comprising non-square microlenses/cells used to form an illumination light profile. Other examples of structures that may be included in light shaping stage 302 to shape and spread light include a roughened surface, a holographic diffuser, or other light shaper and spreader. In some embodiments, light shaping stage 302 may be used to create an "M"-shaped illumination light profile. For instance, in an embodiment, divergent light 308 may be formed to have a cross-sectional light profile that is more intense farther from an optical axis than closer to an optical axis of the divergent light, such as is shown in FIG. 7. In other embodiments, light shaping stage 302 may be configured to shape and spread coherent light 306 into other configurations to form divergent light 308.

Note that diffraction artifact reduction stage 304 is optionally present, and is configured to reduce an intensity of one or more diffraction artifacts from divergent light 308 to generate illumination light 312.

In step 1904, the at least a portion of the divergent light is converted into a plurality of illumination light patterns to be projected into the illumination environment, each of the plurality of illumination light patterns to be projected to corresponding region of the illumination environment. For example, as described above, diffractive element 310 may be configured to convert illumination light 312 or divergent light 308 into multiple illumination profiles as multi-light profile illumination light 108. For example, FIG. 17 shows an illumination profile 1702 that is example of multi-light profile illumination light 108 that may be generated by diffractive element 310. As shown in the example of FIG. 17, multi-light profile illumination light 108 is a combination of three illumination profiles 1704, 1706A, and 1706B. In other embodiments, diffractive element 310 may be configured to convert illumination light 312 or divergent light 308 into other configurations of multiple illumination profiles in multi-light profile illumination light 108. As shown in FIG. 1, multi-light profile illumination light 108 is projected into image environment 106 to illuminate objects.

In some embodiments, the methods and processes described above may be tied to a computing system of one or more computing devices. In particular, such methods and processes may be implemented as a computer-application program or service, an application-programming interface (API), a library, and/or other computer-program product.

For example, the embodiment of TOF depth camera 100 shown in FIG. 1 depicts an example of a non-limiting embodiment of a computing system that can perform one or more of the methods and processes described above. For example, in the embodiment shown in FIG. 1, light generation module 150 may include suitable code or instructions to operate illuminator 102 and depth information module 152 may include suitable code or instructions to operate image sensor 110 and interpret image information detected by detector 114. While the module structures shown in FIG. 1 are illustrated as distinct, standalone entities within TOF depth camera 100, it will be appreciated that the functions performed by such module structures may be integrated and/or distributed throughout TOF depth camera 100 and/or a computing device connected with TOF depth camera 100 without departing from the scope of the present disclosure.

The computing system is shown in simplified form. It will be understood that virtually any computer architecture may be used without departing from the scope of this disclosure. In different embodiments, the computing system may take the form of a mainframe computer, server computer, desktop computer, laptop computer, tablet computer, wearable computing device, home-entertainment computer, network computing device, gaming device, mobile computing device, mobile communication device (e.g., smart phone), mobile vehicle (e.g., an automobile, a motorcycle, a boat, etc.), etc.

TOF depth camera 100 includes a logic subsystem 160 and a storage subsystem 162. TOF depth camera 100 may optionally include a display subsystem 164, input/output-device subsystem 166, and/or other components not shown in FIG. 1.

Logic subsystem 160 includes one or more physical devices configured to execute instructions. For example, logic subsystem 160 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

Logic subsystem 160 may include one or more processors configured to execute software instructions. Additionally or alternatively, logic subsystem 160 may include one or more hardware or firmware logic machines configured to execute hardware or firmware instructions. The processors of logic subsystem 160 may be single-core or multi-core, and the programs executed thereon may be configured for sequential, parallel or distributed processing. Logic subsystem 160 may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 162 includes one or more physical, non-transitory, devices configured to hold data and/or instructions executable by logic subsystem 160 to implement the herein-described methods and processes. When such methods and processes are implemented, the state of storage subsystem 162 may be transformed—e.g., to hold different data.

Storage subsystem 162 may include removable media and/or built-in devices. Storage subsystem 162 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others physical hardware storage devices. Storage subsystem 162 may include volatile, nonvolatile, dynamic, static, read/write, read-only, random-access, sequential-access, location-addressable, file-addressable, and/or content-addressable physical hardware devices. In some embodiments, logic subsystem 160 and storage subsystem 162 may be integrated into one or more unitary physical devices, such as an application-specific integrated circuit (ASIC), or a system-on-a-chip.

The terms "module" or "program" may be used to describe an aspect of the computing system implemented to perform a particular function. In some cases, a module or program may be instantiated via logic subsystem 160 executing instructions held by storage subsystem 162. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

When included, display subsystem 164 may be used to present a visual representation of data held by storage subsystem 162. This visual representation may take the form of a graphical user interface (GUI). As the herein described methods and processes change the data held by the storage subsystem, and thus transform the state of the storage subsystem, the state of display subsystem 164 may likewise be transformed to visually represent changes in the underlying data. Display subsystem 164 may include one or more display devices utilizing virtually any type of technology. Such display devices may be combined with logic subsystem 160 and/or storage subsystem 162 in a shared enclosure, or such display devices may be peripheral display devices.

When included, input/output-device subsystem 166 may be configured to communicatively couple the computing system with one or more other computing devices. Input/output-device subsystem 166 may include wired and/or wireless communication devices compatible with one or more different communication protocols. As non-limiting examples, input/output-device subsystem 166 may be configured for communication via a wireless telephone network, or a wired or wireless local- or wide-area network. In some embodiments, input/output-device subsystem 166 may allow the computing system to send and/or receive messages to and/or from other devices via a network such as the Internet. Input/output-device subsystem 166 may also optionally include or interface with one or more user-input devices such as a keyboard, mouse, game controller, camera, microphone, and/or touch screen, for example.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

IV. Example Embodiments

In one embodiment, a time-of-flight depth camera comprises: a light source configured to generate coherent light; a first optical stage positioned to receive at least a portion of the coherent light, the first optical stage configured to diverge the at least a portion of the coherent light to form divergent light characterized by a light profile that is less intense in a first region centered on an optical axis of the divergent light than in a second region that at least partially rings the first region; a diffractive element positioned to receive at least a portion of the divergent light, the diffractive element configured to convert the at least a portion of the divergent light into a plurality of illumination light patterns to be projected into an illumination environment, each of the plurality of illumination light patterns to be projected to corresponding region of the illumination environment; and an image sensor configured to detect at least a portion of return illumination light reflected from the illumination environment.

In an embodiment, the first optical stage comprises a micro lens array (MLA) that includes opposing first and second surfaces, the first surface including an array of aspheric lenses.

In an embodiment, the plurality of illumination patterns includes a first illumination pattern to be projected to a central far field region of the illumination environment, a second illumination pattern to be projected to a first peripheral near field region of the illumination environment, and a third illumination pattern to be projected to a second peripheral near field region of the illumination environment.

In an embodiment, the diffractive element comprises: a body having opposing first and second surfaces; and a repeating prism pattern in the first surface of the body.

In an embodiment, each prism pattern of the repeating prism pattern has a pyramidal cross-sectional shape.

In an embodiment, each prism pattern of the repeating prism pattern is a staircase pattern.

In an embodiment, each prism pattern of the repeating prism pattern is a pyramidal staircase pattern.

In another embodiment, an optical assembly comprises: a first optical stage positioned to receive coherent light from a light source, the first optical stage configured to diverge the coherent light to form divergent light characterized by a light profile that is less intense in a first region centered on an optical axis of the divergent light than in a second region that at least partially rings the first region; and a diffractive element positioned to receive at least a portion of the divergent light, the diffractive element configured to convert the at least a portion of the divergent light into a plurality of illumination light patterns to be projected into an illumination environment, each of the plurality of illumination light patterns to be projected to corresponding region of the illumination environment.

In an embodiment, the first optical stage comprises a micro lens array (MLA) that includes opposing first and second surfaces, the first surface including an array of aspheric lenses.

In an embodiment, the plurality of illumination patterns includes a first illumination pattern to be projected to a central far field region of the illumination environment, a second illumination pattern to be projected to a first peripheral near field region of the illumination environment, and a third illumination pattern to be projected to a second peripheral near field region of the illumination environment.

In an embodiment, the diffractive element comprises: a body having opposing first and second surfaces; and a repeating prism pattern in the first surface of the body.

In an embodiment, each prism pattern of the repeating prism pattern has a pyramidal cross-sectional shape.

In an embodiment, each prism pattern of the repeating prism pattern is a staircase pattern.

In an embodiment, each prism pattern of the repeating prism pattern is a pyramidal staircase pattern.

In another embodiment, a method of projecting illumination light into an image environment is provided. The method comprises: generating light; and forming, from the generated light, illumination light that is projected into an image environment, the illumination light formed by: diverging at least a portion of the generated light to form divergent light characterized by a light profile that is less intense in a first region centered on an optical axis of the divergent light than in a second region that at least partially rings the first region, and converting the at least a portion of the divergent light into a plurality of illumination light patterns to be projected into the illumination environment, each of the plurality of illumination light patterns to be projected to corresponding region of the illumination environment.

In an embodiment, the plurality of illumination patterns includes a first illumination pattern to be projected to a central far field region of the illumination environment, a second illumination pattern to be projected to a first peripheral near field region of the illumination environment, and a third illumination pattern to be projected to a second peripheral near field region of the illumination environment.

In an embodiment, the converting comprises: directing the at least a portion of the divergent light through a body having a repeating prism pattern in a surface of the body.

In an embodiment, the directing comprises: directing the at least a portion of the divergent light through the body having a plurality of repeating pyramidal cross-sectional shapes as the repeating prism pattern in the surface of the body.

In an embodiment, the directing comprises: directing the at least a portion of the divergent light through the body having a plurality of repeating staircase shapes as the repeating prism pattern in the surface of the body.

In an embodiment, the directing comprises: directing the at least a portion of the divergent light through the body having a plurality of repeating pyramidal staircase shapes as the repeating prism pattern in the surface of the body.

V. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A time-of-flight depth camera, comprising:
   a light source configured to generate coherent light;
   a first optical stage positioned to receive at least a portion of the coherent light, and configured to diverge the at least a portion of the coherent light to form divergent light;
   a diffractive element positioned to receive at least a portion of the divergent light, and configured to convert the at least a portion of the divergent light into a plurality of illumination light patterns to be projected into an illumination environment, the plurality of illumination light patterns including a first illumination light pattern projected to a central far field region of the illumination environment and a second illumination light pattern projected to a first peripheral region of the illumination environment; and
   an image sensor configured to detect at least a portion of return illumination light reflected from the illumination environment.

2. The time-of-flight depth camera of claim 1, wherein the first optical stage comprises a micro lens array (MLA) that includes opposing first and second surfaces, the first surface including an array of aspheric lenses.

3. The time-of-flight depth camera of claim 1, wherein the first peripheral region is a near field region, and the plurality of illumination patterns further includes a third illumination pattern to be projected to a second peripheral near field region of the illumination environment.

4. A time-of-flight depth camera, comprising:
   a light source configured to generate coherent light;
   a first optical stage positioned to receive at least a portion of the coherent light, the first optical stage configured to diverge the at least a portion of the coherent light to form divergent light characterized by a light profile that is less intense in a first region centered on an optical axis of the divergent light than in a second region that at least partially rings the first region;
   a diffractive element positioned to receive at least a portion of the divergent light, the diffractive element configured to convert the at least a portion of the divergent light into a plurality of illumination light patterns to be projected into an illumination environment, each of the plurality of illumination light patterns to be projected to a corresponding region of the illumination environment; and an image sensor configured to detect at least a portion of return illumination light reflected from the illumination environment;

wherein the diffractive element comprises:
a body having opposing first and second surfaces; and
a repeating prism pattern in the first surface of the body.

5. The time-of-flight depth camera of claim 4, wherein each prism pattern of the repeating prism pattern has a pyramidal cross-sectional shape.

6. The time-of-flight depth camera of claim 4, wherein each prism pattern of the repeating prism pattern is a staircase pattern.

7. The time-of-flight depth camera of claim 4, wherein each prism pattern of the repeating prism pattern is a pyramidal staircase pattern.

8. The time-of-flight depth camera of claim 1, further comprising:
a second optical stage positioned between the first optical stage and the diffractive element to receive at least a portion of the divergent light, the second optical stage adapted to reduce an intensity of one or more diffraction artifacts in the divergent light.

9. An optical assembly, comprising:
a first optical stage positioned to receive coherent light from a light source, and configured to diverge the coherent light to form divergent light; and
a diffractive element positioned to receive at least a portion of the divergent light, and configured to convert the at least a portion of the divergent light into a plurality of illumination light patterns to be projected into an illumination environment, the plurality of illumination light patterns including a first illumination light pattern projected to a central far field region of the illumination environment and a second illumination light pattern projected to a first peripheral region of the illumination environment.

10. The optical assembly of claim 9, wherein the first optical stage comprises a micro lens array (MLA) that includes opposing first and second surfaces, the first surface including an array of aspheric lenses.

11. The optical assembly of claim 9, wherein the first peripheral region is a near field region, and the plurality of illumination patterns further includes a third illumination pattern to be projected to a second peripheral near field region of the illumination environment.

12. An optical assembly, comprising:
a first optical stage positioned to receive coherent light from a light source, the first optical stage configured to diverge the coherent light to form divergent light characterized by a light profile that is less intense in a first region centered on an optical axis of the divergent light than in a second region that at least partially rings the first region; and
a diffractive element positioned to receive at least a portion of the divergent light, the diffractive element configured to convert the at least a portion of the divergent light into a plurality of illumination light patterns to be projected into an illumination environment, each of the plurality of illumination light patterns to be projected to a corresponding region of the illumination environment;
wherein the diffractive element comprises:
a body having opposing first and second surfaces; and
a repeating prism pattern in the first surface of the body.

13. The optical assembly of claim 12, wherein each prism pattern of the repeating prism pattern has a pyramidal cross-sectional shape.

14. The optical assembly of claim 12, wherein each prism pattern of the repeating prism pattern is a pyramidal staircase pattern.

15. A method of projecting illumination light into an image environment, the method comprising:
generating light; and
forming, from the generated light, illumination light that is projected into an image environment, the illumination light formed by:
diverging at least a portion of the generated light to form divergent light, and
converting the at least a portion of the divergent light into a plurality of illumination light patterns to be projected into the illumination environment, the plurality of illumination light patterns including a first illumination light pattern projected to a central far field region of the illumination environment and a second illumination light pattern projected to a first peripheral region of the illumination environment.

16. The method of claim 15, wherein the first peripheral region is a near field region, and the plurality of illumination patterns further includes a third illumination pattern to be projected to a second peripheral near field region of the illumination environment.

17. A method of projecting illumination light into an image environment, the method comprising:
generating light; and
forming, from the generated light, illumination light that is projected into an image environment, the illumination light formed by:
diverging at least a portion of the generated light to form divergent light characterized by a light profile that is less intense in a first region centered on an optical axis of the divergent light than in a second region that at least partially rings the first region, and
converting the at least a portion of the divergent light into a plurality of illumination light patterns to be projected into the illumination environment, each of the plurality of illumination light patterns to be projected to a corresponding region of the illumination environment;
wherein said converting comprises:
directing the at least a portion of the divergent light through a body having a repeating prism pattern in a surface of the body.

18. The method of claim 17, wherein said directing comprises:
directing the at least a portion of the divergent light through the body having a plurality of repeating pyramidal cross-sectional shapes as the repeating prism pattern in the surface of the body.

19. The method of claim 17, wherein said directing comprises:
directing the at least a portion of the divergent light through the body having a plurality of repeating staircase shapes as the repeating prism pattern in the surface of the body.

20. The method of claim 17, wherein said directing comprises:
directing the at least a portion of the divergent light through the body having a plurality of repeating pyramidal staircase shapes as the repeating prism pattern in the surface of the body.

* * * * *